(12) United States Patent
Newlin

(10) Patent No.: US 6,205,739 B1
(45) Date of Patent: Mar. 27, 2001

(54) CONNECTOR NODE

(75) Inventor: Mark A. Newlin, Midland, TX (US)

(73) Assignee: Tomcat Global Corporation, Midland, TX (US)

( * ) Notice: Subject to any disclaimer, the term of this patent is extended or adjusted under 35 U.S.C. 154(b) by 0 days.

(21) Appl. No.: 09/168,700

(22) Filed: Oct. 9, 1998

(51) Int. Cl.[7] .................................................. E04H 12/00
(52) U.S. Cl. .......................... 52/655.1; 52/653.2; 52/645
(58) Field of Search ............................... 52/650.1, 653.1, 52/653.2, 655.1, 645, 646

(56) References Cited

U.S. PATENT DOCUMENTS

| 4,577,449 | * | 3/1986 | Celli | 52/721 |
| 5,013,176 | * | 5/1991 | Orbom | 403/171 |
| 5,049,005 | * | 9/1991 | Lazare | 405/216 |
| 5,205,101 | | 4/1993 | Swan et al. | |
| 5,938,364 | * | 8/1999 | Hayden | 403/171 |

FOREIGN PATENT DOCUMENTS

| 859752 | 11/1956 | (GB) . |
| 1088460 | 7/1965 | (GB) . |
| 1320777 | 6/1969 | (GB) . |

* cited by examiner

*Primary Examiner*—Beth A. Stephan
(74) *Attorney, Agent, or Firm*—Jones, Day, Reavis & Pogue

(57) ABSTRACT

A connector for readily fabricating trusses or scaffolding for use in temporary, demountable construction which cooperate with elongated support members to fabricate modular box trusses.

18 Claims, 5 Drawing Sheets

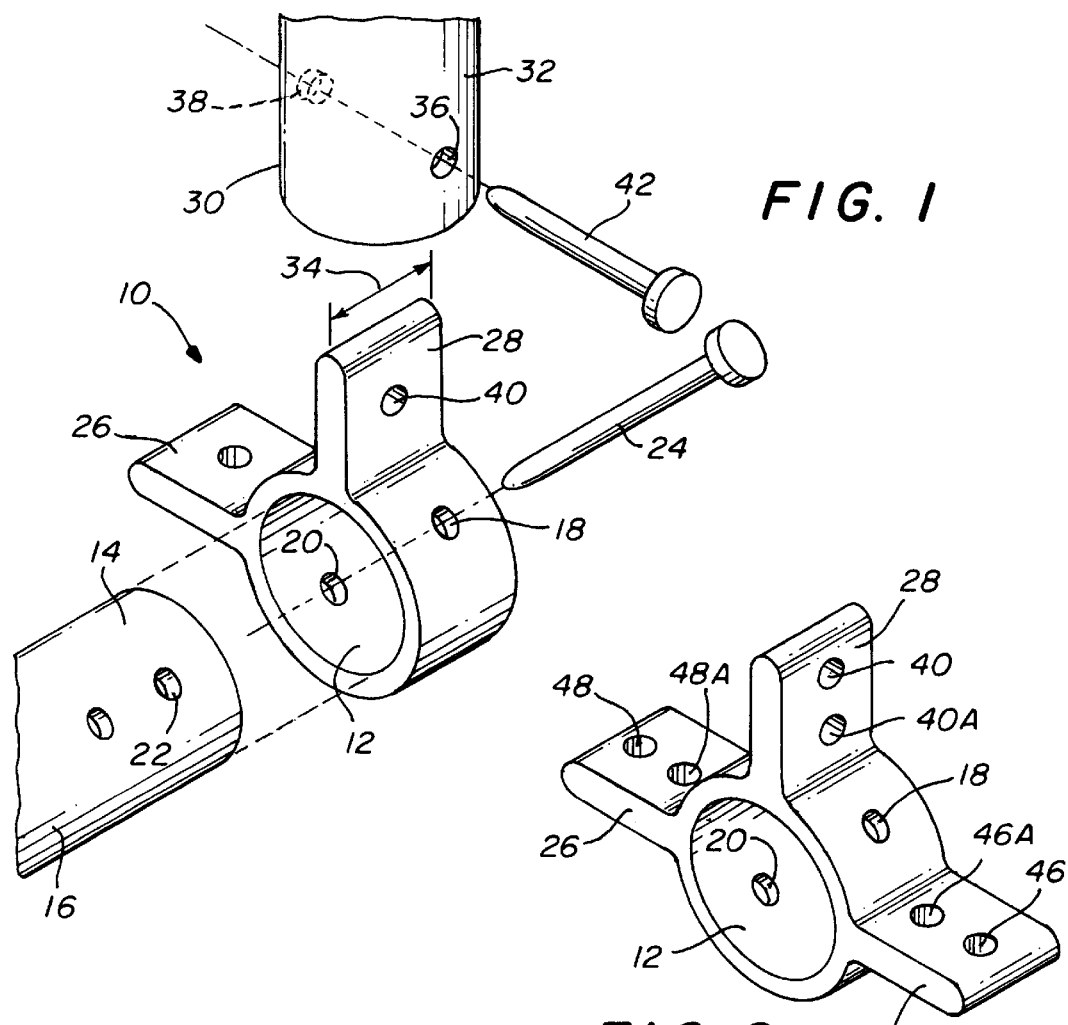
FIG. 1
FIG. 2
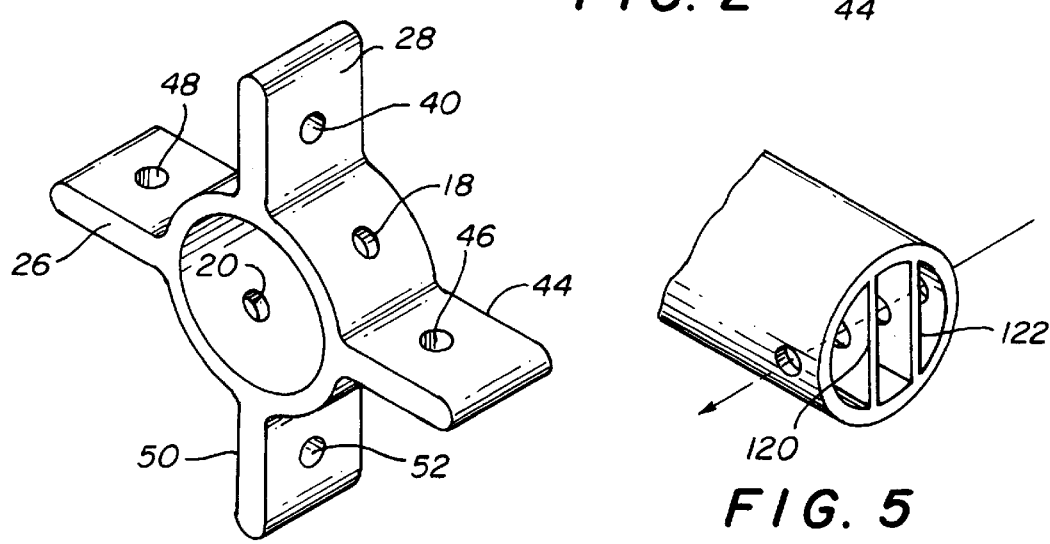
FIG. 3
FIG. 5

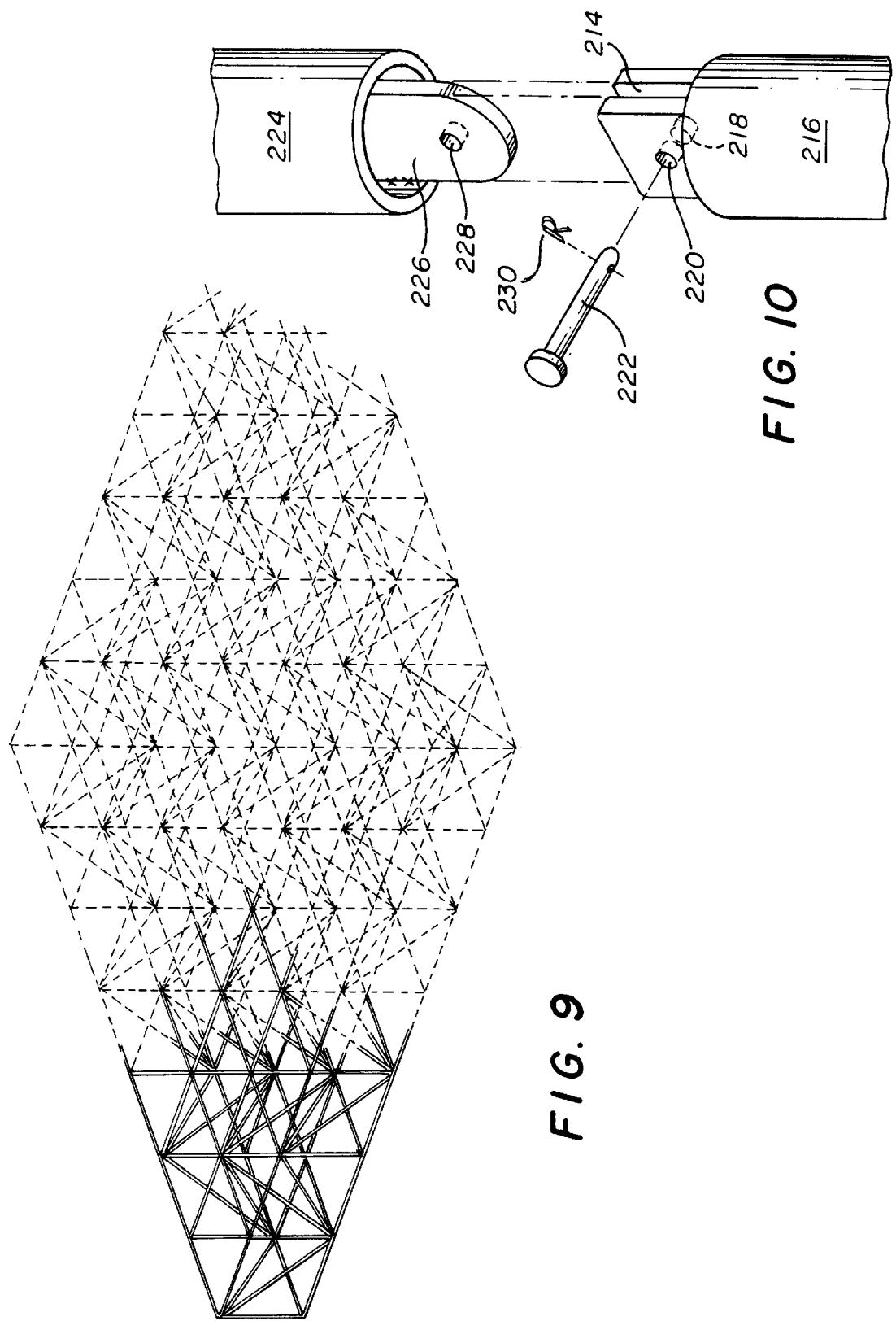

CONNECTOR NODE

BACKGROUND OF THE INVENTION

1. Field of the Invention

The present invention relates in general to the rapid fabrication of temporary trusses or scaffolding and, in particular, to a connector or connector node which cooperates with elongated support members for the fabrication of such readily demountable trusses and scaffolding.

2. Description of Related Art Including Information Disclosed Under 37 Car 1.97 and 1.98

It is well known in the prior art that there is a great need for the construction of exhibition, display, and concert staging that requires the use of truss members that can be connected together in a well-known fashion to form the finished stage or exhibition. Many of these exhibitions or staging displays are quite elaborate and are associated with groups, such as music groups, that travel from one location to another to perform concerts. This means that the staging must be shipped to the desired location, assembled, the concert performed, the staging dissembled, and shipped again to the next location for another concert.

It is well known that the shipping of truss units can be very expensive because the assembled truss units require a great amount of space. This means, of course, that the greater the number of trucks and personnel that are required to ship the staging trusses, the greater the expense.

Likewise, there is also a great need for scaffolding that can be quickly assembled for construction or maintenance purposes and then readily disassembled and moved to another location either at the same construction or work site or to a new work site.

It would be extremely advantageous to have a readily fabricated truss that could be used in temporary, demountable construction or maintenance sites by simplifying the fabrication of the truss or scaffolding, reducing the number of parts required, and by simplifying the assembly process.

SUMMARY OF THE INVENTION

The present invention enables the rapid fabrication of a truss for use in temporary, demountable construction for use in presentations such as exhibition, display, and concert staging or, alternately, rapidly fabricated scaffolding that can be readily assembled and disassembled. This simplifies the fabrication of the truss or scaffolding by reducing the number of different parts and by simplifying the assembly process. The truss or scaffolding is assembled from a multiplicity of connectors that incorporate the teaching of this invention along with precut lengths of elongated support members, such as hollow tubes which have attaching ends defining at least one aperture. Each connector includes a hollow duct portion for receiving an elongated support member with a sliding fit and further includes at least two attaching tongues rigidly secured to the hollow duct portion. Each attaching tongue defines an aperture, and the attaching tongue is suitable for being received at the attaching end of one of the elongated support numbers. Depending upon where the connectors or the connector node is used in the construction of the truss, the node may use two attaching tongues or, alternately, may have three attaching tongues or even four attaching tongues. Thus, the connector node may be attached to an elongated support member in two ways. First, the hollow duct portion of the connector is slid over the end of the elongated support member such that the aperture in the connector and the aperture defined in the attaching end of the elongated member are aligned and can receive a removable locking pin. Second, the attaching tongue of the connector may be received in the hollow end of the elongated support member so that the aperture defined by the attaching end of the support member is aligned with the aperture defined in the attaching tongue received by the elongated support member. Again, a removable pin is inserted to lock the two members together.

Of course, the elongated support members and the connectors of this invention may be mass produced by any conventional manufacturing process. Further, the connector nodes and the elongated support members can be quickly fitted together by unskilled labor. Also, the truss or scaffolding can be made to any convenient size by using as many of the elongated members and connectors as is necessary.

The connector nodes may be made from die-cast aluminum or injection molded with reinforced plastic. Likewise, the cords or elongated support members may be made from either aluminum or plastic composites, such as carbon fiber reinforced plastic.

It will be understood, of course, that the strength of the truss can be varied by adjusting the thickness of the attaching tongues and the cross-sectional area of the elongated support members and/or by varying the wall thickness of the elongated support members.

As mentioned, an important feature of the present invention is that trusses or scaffolding can be disassembled quickly, shipped to a new location, and reassembled by unskilled labor at the new location where the truss or scaffolding is needed. This enables a great saving in fabrication costs because of the rapidity and ease of fabrication.

Thus, it is an object of the present invention to provide a connector or connector node readily assembling and disassembling trusses or scaffolding for use in temporary, demountable construction.

Thus, the present invention relates to a connector for fabricating trusses or scaffolding for use in temporary, demountable construction and comprises a hollow duct portion for receiving an elongated support member with a sliding fit and further includes two attaching tongues rigidly secured to the hollow duct portion and each attaching tongue defining at least one aperture for receiving a connector pin.

The invention also relates to a truss or scaffolding for use in temporary, demountable construction using precut lengths of elongated support members having a shaft portion extending between first and second attaching ends wherein each of the attached ends define an aperture therethrough. The elongated support members may be connected to a plurality of connectors with a sliding fit such that apertures defined in the hollow duct portion of the connectors and the elongated support member may be aligned and secured by a connector pin. Each connector further includes at least two attaching tongues which are received by the hollow end of an elongated support member such that the apertures defined in the attaching tongue and the attaching end of the support member may be aligned and a connecting pin inserted to secure the two members together.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which:

FIG. 1 is an oblique view of a connector node having two attaching tongues according tore teachings of the present invention;

FIG. 2 is an oblique view of a connector node of the type shown in FIG. 1 having a third attaching tongue;

FIG. 3 is an oblique view of a connector node according to the teachings of the present invention having four attaching tongues;

FIG. 5 is a an partial perspective view of the end of an elongated support member showing reinforcement members through the center of the support member;

FIG. 9 is an isometric view of a complex truss fabricated from a multiplicity of elongated support members and connector nodes according to the teachings of this invention.

FIG. 10 is a prior art technique using a plate and clevis arrangement for securing vertical support members end-to-end.

DETAILED DESCRIPTION OF THE PREFERRED EMBODIMENT(S)

Figure 4:
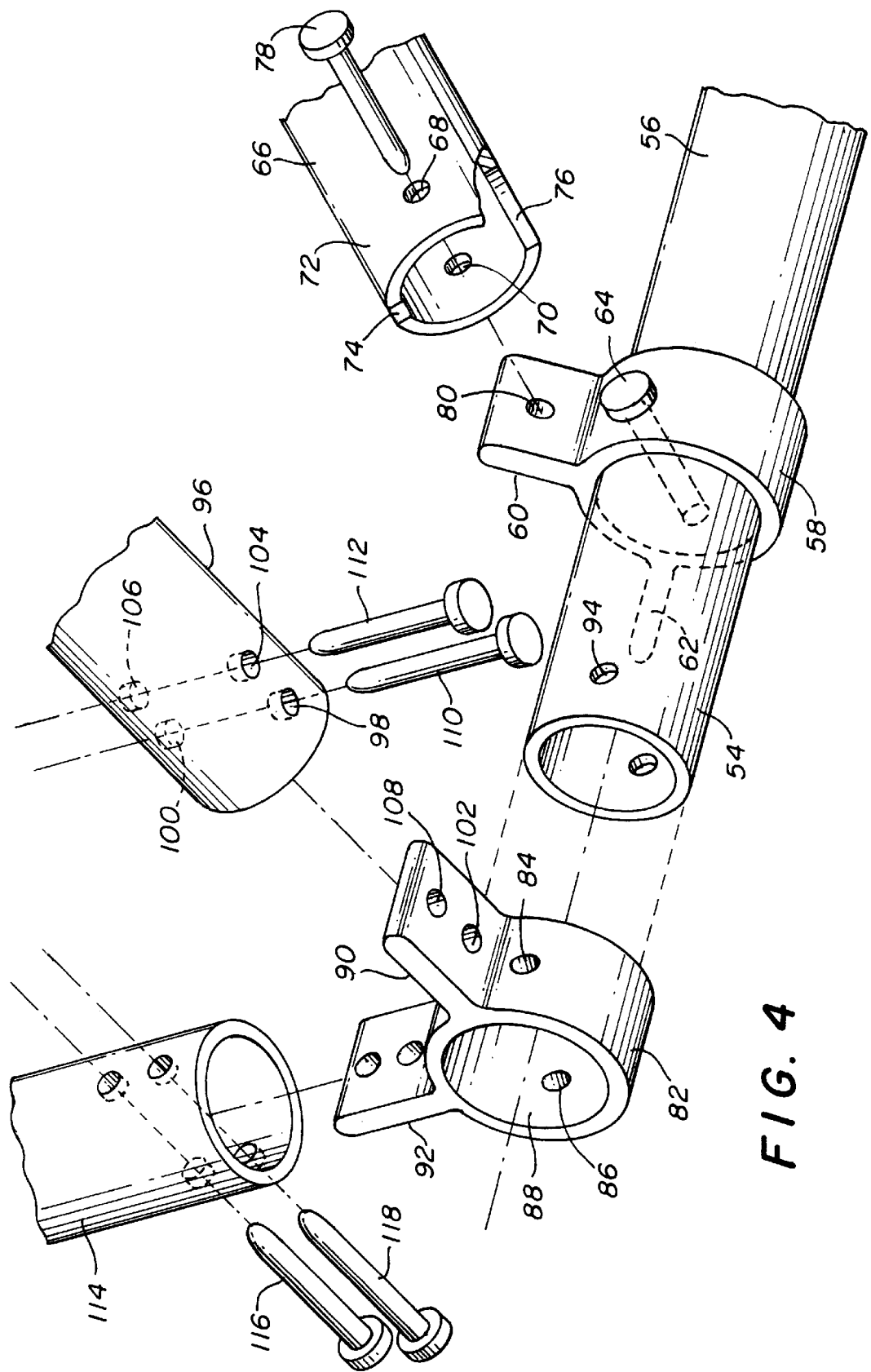
FIG. 4 is an exploded perspective view illustrating the interconnection of elongated support members and the connector nodes of this invention.

Referring now to FIG. 1, there is shown a connector 10 having two attaching tongues according to the teachings of this invention. As shown, there is a hollow duct portion 12 having an inside diameter suitable for receiving the attaching end 14 of an elongated support member 16 with a sliding fit. The hollow duct portion 12 of connector 10 defines a pair of apertures 18 and 20 which may be aligned with aperture 22 in end 14 of elongated structure support member 16 such that a locking pin 24 maybe inserted through the aligned holes 18, 20, and 22 to secure connector node 10 to elongated support member 16. Attaching tongues 26 and 28 are formed, welded, or molded to the hollow duct portion 12 and are suitable for being received in the hollow end 30 of another elongated support member 32. The width of attaching tongue 28, shown by dimension 34 in the drawing is specifically selected such that attaching tongue 28 is received with a sliding fit in the hollow end 30 of elongated support member 32. An aperture 36 in the hollow wall of elongated support member is aligned with a second aperture 38 (shown in dotted lines) such that, when the attaching tongue 28 is received by the elongated support member, the aperture 40 defined by attaching tongue 28 may be aligned with aperture 36 and 38 of the elongated support member such that a second locking pin 42 may be inserted through the aligned apertures to secure member 32 to connector node 10. It will be appreciated that the connector node 10 may be made from die-cast aluminum, steel, or other suitable strong material. Likewise, the elongated support members, sometimes referred to as chords, may also be made from aluminum or plastic composites such as carbon fiber reinforced plastic. Also, as shown, attaching tongues 26 and 28 are located on hollow duct portion 12 at substantially a 90-degree angle between the two.

Referring now to FIGS. 2 and 3, there are shown connectors or connector nodes of the present invention having 3 and 4 attaching tongues respectively. FIGS. 2 and 3 use common reference numbers for identical portions of the structures, which were illustrated in FIG. 1. As shown in FIG. 2, the connector node of this invention may include a third attaching tongue, which is located at substantially 90 degrees from attaching tongue 28 and 180 degrees from attaching tongue 26. Also as shown, each of the attaching tongues 26, 28, and 44 of the connector of FIG. 2 define two apertures, such as apertures 40 and 40A in attaching tongue 28, apertures 46 and 46A in attaching tongue 44, and apertures 48 and 48A in attaching tongue 26. As will be appreciated by reference to the drawings described hereinafter, the use of the three types of attaching tongues allows a series of box trusses or scaffolding to be joined so that such trusses or scaffolding of any desired length or size may be fabricated. It will be appreciated that, although FIG. 1 and FIG. 3 (described hereafter) show only one aperture defined in each attaching tongue, two apertures such as shown in FIG. 2 may be defined in each attaching tongue to achieve greater rigidity in the fabricated truss or scaffolding.

Referring now to FIG. 3, there is shown still another connector node of the present invention which has four attaching tongues. Again, as was true with respect to FIG. 2, reference numbers of portions of the connector structure common to FIGS. 1 and 2 will be the same. As shown, in addition to attaching tongues 26, 28, and 44, the connector node of FIG. 3 includes a fourth attaching tongue 50 located substantially 90 degrees from both attaching tongues 44 and 26 and defines an aperture 52. It will be appreciated that by using a connector with four attaching tongues to fabricate a truss or scaffolding, the squared truss boxes can be added in two directions.

Referring to FIG. 4, there is shown a partial exploded view of a typical construction of a truss using the connectors of the present invention. As shown, there is an end portion 54 of an elongated support member 56 inserted through a connector or connecting node 58 with a sliding fit. The connector node has two attaching tongues 60 and 62 (62 shown in dotted lines) secured to the elongated support member by an attaching pin 64 inserted through aligned apertures in the elongated support member 56 and connector 58. As shown, there is a second elongated member 66, which defines aligned apertures 68 and 70 in the end 72. Also as shown, end 72 of elongated member 66 further defines two attaching slots 74 and 76 such that end 72 of elongated member 66 may receive attaching tongue 60 of connector 58 at a selected angle. Also as shown, a locking pin 78 may be inserted through aligned apertures 68 and 70 in elongated member 66 and in aperture 80 in attaching tongue 60.

There is also shown a second connector or connecting node 82 defining aligned apertures 84 and 86 through the hollow duct portion 88. The connector node 82 further includes two attaching tongues 90 and 92, each attaching tongue defining a pair of apertures. It will be appreciated that connector node 82 may receive end 54 of elongated member 56 with a sliding fit such that apertures 84 and 86 are aligned with apertures 94 and 94A of elongated member 56 so that another locking pin (not shown) may secure connector node 82 to elongated support member 56. Also as shown, another hollow elongated member 96 may receive the attaching tongue 90 of connector node 82 such that apertures 98 and 100 defined by elongated member 96 are aligned with aperture 102 of attaching tongue 90. In a similar manner, apertures 104 and 106 are be aligned with aperture 108 in attaching tongue 90 such that locking pins 110 and 112 may be inserted to secure the elongated support member 96 to attaching tongue 90. It will be appreciated that, unlike the elongated support member 66 discussed above with respect to connecter node 58, elongated member 96 will be at a right angle or 90 degrees with respect to elongated support member 66. In a similar manner, hollow elongated support member 114 may be secured to attaching tongue 92 of connector 82 by passing locking pins 116 and 118 through aligned apertures defined in elongated support member 114 and attaching tongue 92. It will also be appreciated that according to this method of attachment, elongated support member 114 will be perpendicular to both elongated support member 56 and elongated members 96.

The elongated support members or chords as discussed heretofore have been discussed as being hollow tubing. As shown in FIG. 5, however, the hollow tubing elongated members may further include reinforcement or strengthening ribs 120 and 122. It will, of course, be appreciated that the use of such reinforcement ribs will also require apertures to be defined in such ribs also in alignment with the apertures defined by the walls of the hollow tubing.

It will also be appreciated that although all of the connector nodes or connectors discussed heretofore illustrate a hollow duct portion having a circular cross section or cylindrical form it is also intended to be included in the scope of this invention that the hollow duct portion could be of any other cross section such as triangular, square, hectagon, or octagon or any other suitable cross-sectional shape. Connector nodes or connectors with a cross-sectional hollow duct portion other than a circular cross section will require, of course, that the elongated members used with the connectors for constructing trusses or scaffolding have a cooperating cross-sectional shape.

Figure 6:
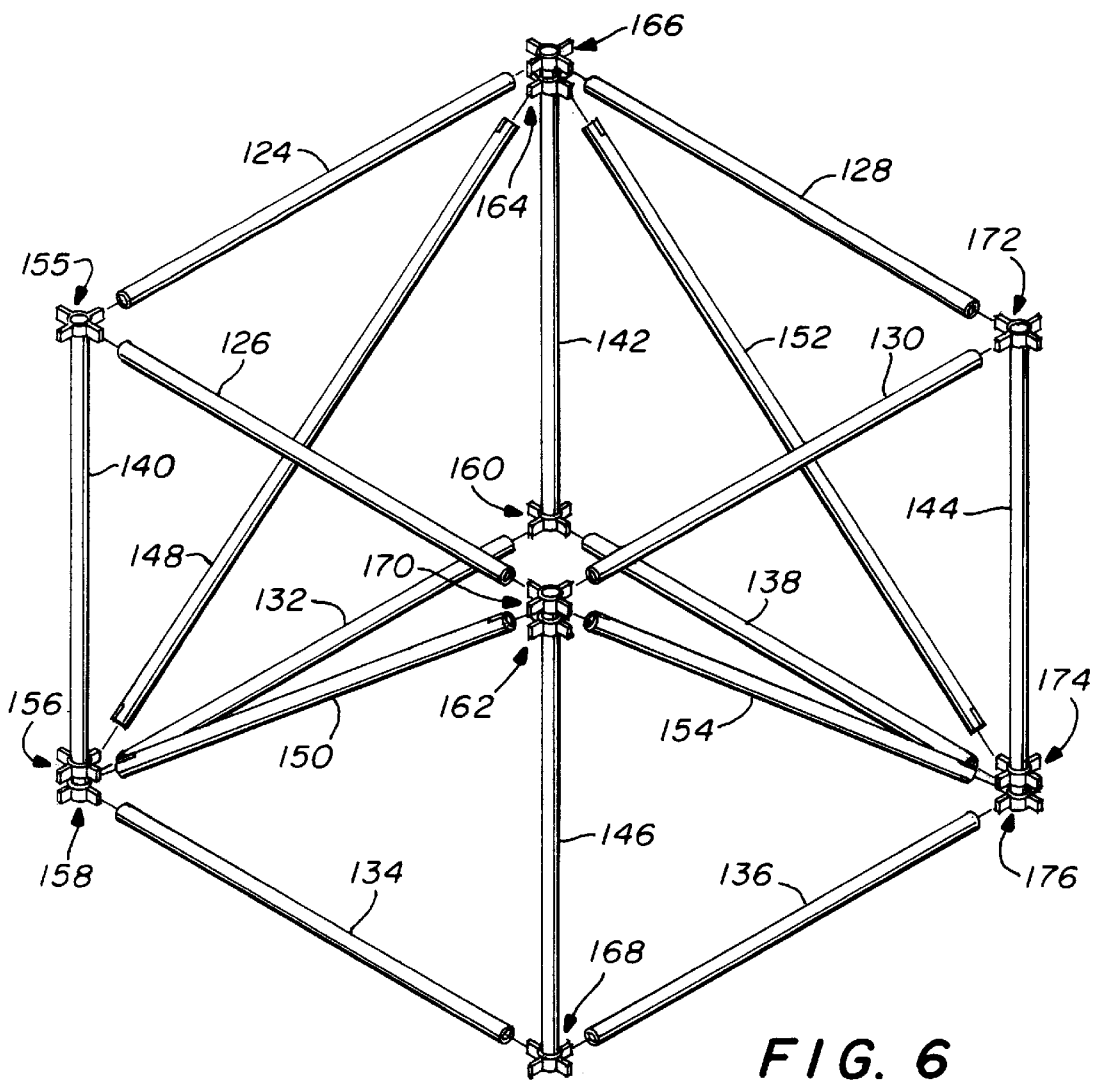
FIG. 6 is an exploded isometric view of a plurality of elongated support members and connector nodes of this invention in a typical box truss construction.
Figure 7:
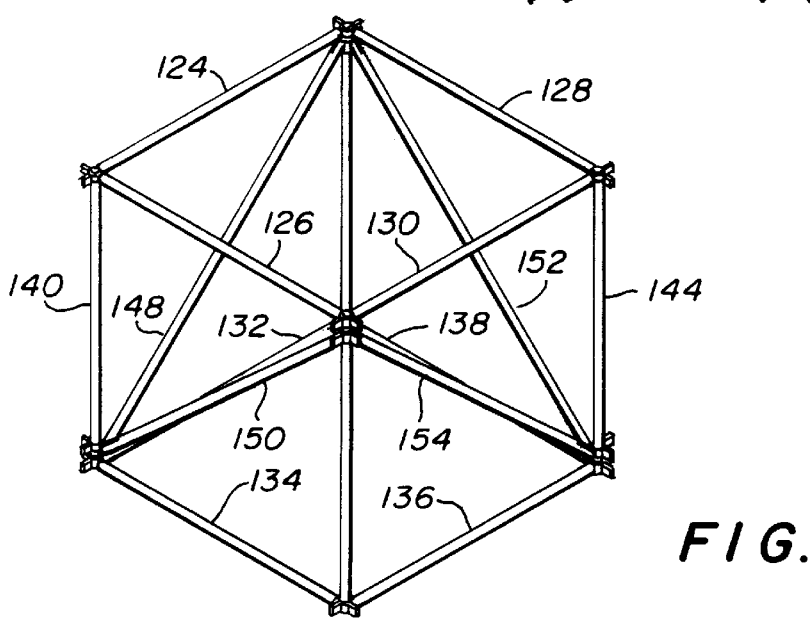
FIG. 7 is a an isometric view of the exploded view of FIG. 6 showing the connector node and elongated support members secured together.

Referring now to FIG. 6, there is shown an exploded view of a box truss or scaffolding module fabricated by the novel connectors of this invention. In FIG. 6 as shown, there are four top horizontal members 124, 126, 128, and 130, four horizontal bottom elongated support members 132, 134, 136, and 138, four vertical elongated support members 140, 142, 144, and 146, and four diagonal elongated support members 148, 150, 152, and 154. In addition, there are three connectors 155, 156, and 158 having four attaching tongues such as shown in FIG. 3, six attaching connecting nodes 160, 162, 164, 166, 168, and 170 having three attaching tongues as shown in FIG. 2 (Note: connector node 170 located at the bottom of vertical elongated support member 142 is obstructed from view by connector nodes 160 and 162 located at the top of vertical elongated support member 146), and three connector nodes 172, 174, and 176 having two attaching tongues such as shown in FIG. 1. The use of a multiplicity of connector nodes of different types and a multiplicity of elongated members allows a box truss or scaffolding such as shown in FIG. 7 to be assembled.

Figure 8:
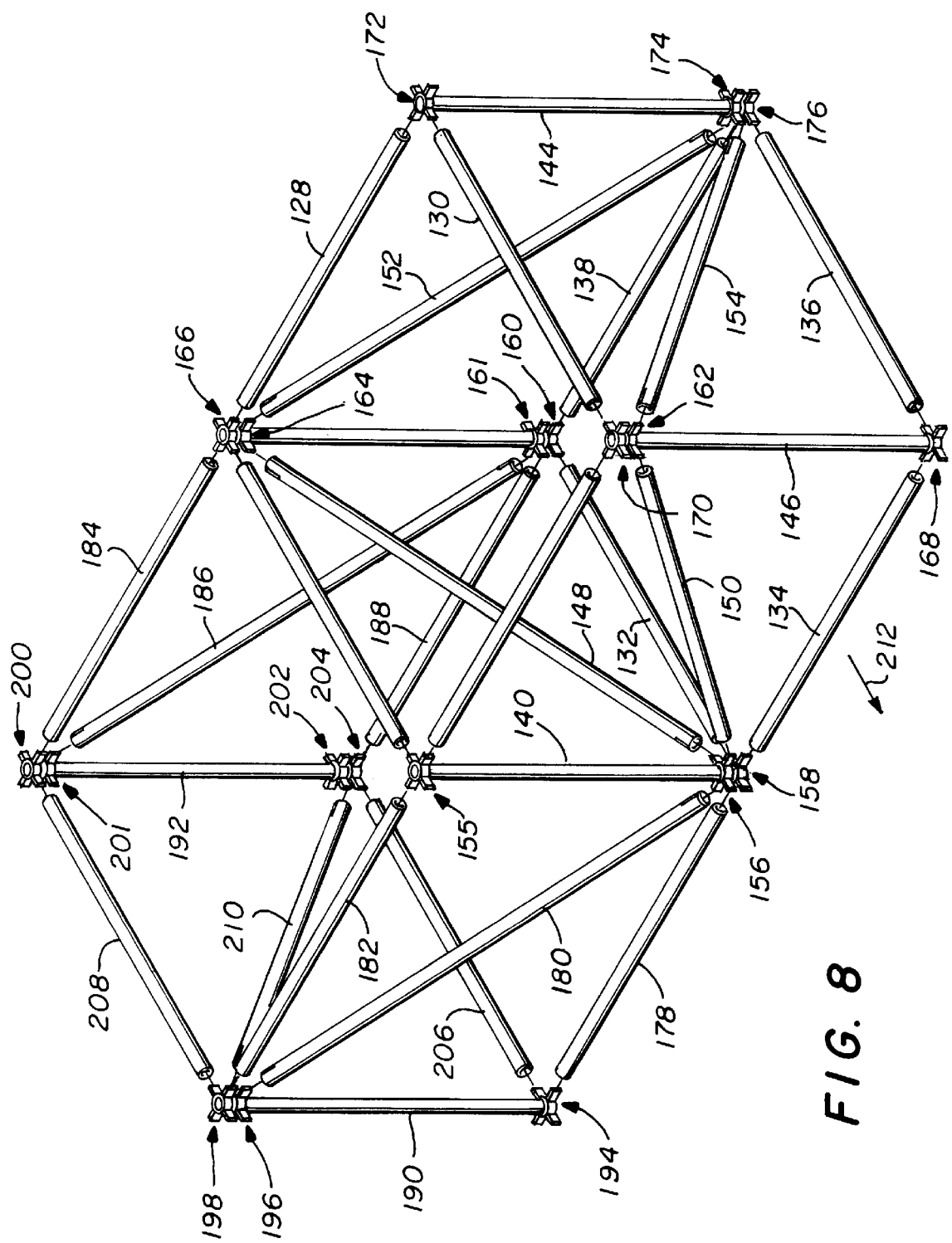
FIG. 8 is an exploded isometric view of the box truss of FIG. 6 with additional elongated support members and connector nodes to fabricate two box trusses secured together.

Referring now to FIG. 8, there is shown six additional elongated support members 178, 180, 182, 184, 186, and 188 connected to connector nodes 154, 156, 158, 164, 166, and 170. By using these six elongated members, two additional vertical elongated support members 190 and 192, connector nodes 194, 196, 198, 200, 202, and 204 and three more side elongated support members 206, 208, and 210, a box truss forming two modules may be fabricated. It will also be appreciated from FIG. 8 that, by the addition of still further elongated support members connected to connectors 154 through 198, two additional modular box trusses may be fabricated in the direction indicated by the arrow 212.

Finally, there is shown in FIG. 9 a very complex structure typical of the trusses that can be fabricated by the use of the teachings of this invention.

Finally, there will be appreciated that even a multilayer truss or scaffolding may be achieved by using a truss or scaffolding such as shown in FIG. 9 and then adding additional layers. To achieve the additional layers, it would be necessary to include an attaching means at the top of the vertical elongated support members. As shown in FIG. 10, there is a prior art technique using a plate and clevis arrangement for securing vertical support members end-to-end. A clevis 214 is welded or molded or otherwise securely formed to the end of vertical member 216. Clevis 214 includes two portions which define aligned apertures 218 and 220 for receiving a locking pin 222. The second vertical elongated support member 224, which is to be attached to the top of vertical support member 216, includes a plate member 226 welded or otherwise secured to the end of elongated member 224 which defines an aperture 228. The aperture 228 may be aligned with apertures 218 and 220 in the clevis 214 so that the locking pin 222 can be inserted therethrough and then held in position by retaining pin 230.

The corresponding structures, materials, and equivalents of all means or step-plus-function elements in the claims below are intended to include any structure, material, or act for performing the function in combination with other claimed elements as specifically claimed.

I claim:

1. A connector for fabricating trusses for use in temporary, demountable construction comprising:

a hollow duct portion defining an interior cross-section of a selected shape for receiving with a sliding fit, any one of at least three interchangeable elongated support members, each of said elongated support members having an exterior cross-section of said selected shape, and said elongated support members further having hollow end portions; and at least two attaching tongues rigidly secured to said hollow duct portion, each attaching tongue for being received by a hollow end portion of another one of said at least three interchangeable elongated support members, and defining at least one aperture for receiving a connector pin.

2. The connector of claim 1 wherein said connector is made of die-cast aluminum.

3. Connector of claim 1 wherein said connector is made of a plastic composite such as carbon fiber reinforced plastic.

4. A connector of claim 1 and further comprising a third attaching tongue having said substantially constant cross-section and secured to said hollow duct portion at 90 degrees from a first one of said two attaching tongues and 180 degrees from the second one of said two attaching tongues.

5. The connector of claim 4 and further comprising a fourth attaching tongue having said substantially constant cross-section and secured to said hollow duct portion at 90 degrees from said first and third attaching tongues.

6. The connector of claim 1 wherein said hollow duct portion has a cylindrical cross section.

7. The connector of claim 1 wherein one of said attaching tongues of a connector defines two apertures therethrough.

8. A truss for use in temporary, demountable construction comprising:

a plurality of elongated support members, each one of said plurality of a selected length defining an exterior cross-section of a selected shape and having a shaft portion extending between first and second hollow attaching ends, each of said hollow attaching ends defining an aperture therethrough;

a plurality of connectors, each connector comprising a hollow duct portion defining an interior cross-section of said selected shape for receiving one of said elongated support members with a sliding fit, said hollow duct portion defining an aperture therethrough;

at least two attaching tongues rigidly secured to said hollow duct portion of each of said connectors for being received by the hollow attaching end of a different one of said plurality of elongated support members, each of said attaching tongues defining an aperture therethrough;

a first connecting pin for securing a first one of said connectors to a first one of said elongated support members when said aperture of said hollow duct portion of said first one of said connectors is aligned with the aperture through an attaching end of said first one of said elongated support members; and a second connecting pin for securing said first one of said connectors to another one of said elongated support members at substantially 90 degrees with said first one of said elongated support member when one of said attaching tongues of said first one of said connectors is received by said hollow attaching end of said another elongated support members and said aperture in said hollow attaching end of said another elongated support member is aligned with the aperture in said attaching tongue of said first connector.

9. The truss of claim 8 and further comprising a second one of said connectors wherein one of said hollow attaching ends of said first one of said elongated support members defines two spaced apertures therethrough such that said first one of said elongated support members is received by and secured to both of said first one and said second one of said connectors at said hollow attaching end.

10. The truss of claim 9 wherein one of said elongated support members defines a pair of attaching slots in one of said attaching ends and wherein one of said two connectors secured to said attaching end of said elongated support member receives the attaching end of said elongated support member having attaching slots defined therein at an angle other than 90 degrees.

11. The truss of claim 8 wherein said connector is made of die-cast aluminum.

12. The truss of claim 8 wherein said connector is made of composite plastic such as carbon fiber reinforced plastic.

13. The truss of claim 8 and further comprising a third attaching tongue rigidly secured to said hollow duct portion so as to form an angle of 90 degrees from a first one of said attaching tongues and 180 degrees from the second one of said two attaching tongues.

14. The truss of claim 13 and further comprising a fourth attaching tongue rigidly secured to said hollow duct portion and located 90 degrees from both said first and third attaching tongues.

15. The truss of claim 8 wherein said hollow duct portion of said connector has a cylindrical cross section.

16. The truss of claim 8 wherein one of said attaching tongues of said connector defines two apertures therethrough.

17. The truss of claim 16 wherein said attaching tongues defining two apertures therethrough are aligned with two apertures of an attaching end of an elongated member such that two pins may be used to secure said connector and said elongated member.

18. A method of fabricating a truss for use in temporary, demountable construction comprising the steps of:

providing a plurality of elongated support members, each of said plurality defining an exterior cross-section of a selected shape and having a shaft portion of a selected length extending between first and second hollow attaching ends;

defining an aperture through each of said hollow attaching ends of each of said elongated support members;

providing a plurality of connectors having a hollow duct portion defining an interior cross-section of said selected shape and at least two attaching tongues, each of said two tongues for being received by a hollow attaching end of one of said elongated support members;

defining an aperture through each of said attaching tongues;

receiving a first one of said elongated support members by said hollow duct portion of a first one of said connectors with a sliding fit;

aligning said aperture through one of said hollow attaching ends of said first elongated support member with an aperture defined in said duct portion of said first connector;

inserting a pin through said aligned apertures of said duct portion of said first connector and said hollow attached end of said first elongated support member to secure said first connector to said first elongated support member;

receiving each of said at least two attaching tongues of said first connector by said hollow attaching ends of second and third ones of said plurality of elongated support members;

aligning apertures of said hollow attaching ends of said second and third elongated support members one each with apertures in said at least two attaching tongues of said first connector received by said attaching ends; and inserting a pin through said aligned apertures of said attaching tongues and said hollow attaching ends to secure said first connector to said second and third elongated support members.

* * * * *